United States Patent [19]

Dilley

[11] 3,868,579

[45] Feb. 25, 1975

[54] REGENERATIVE, SYNCHRONOUS, PULSE PHASE DEMODULATOR

[75] Inventor: Douglas M. Dilley, San Diego, Calif.

[73] Assignee: The United States of America as represented by the Secretary of the Navy, Washington, D.C.

[22] Filed: Dec. 10, 1973

[21] Appl. No.: 423,026

[52] U.S. Cl. .................. 329/107, 328/110, 329/126

[51] Int. Cl. .............................................. H03k 9/04

[58] Field of Search ........... 328/109, 110, 117, 141, 328/155; 329/106, 107, 122, 126; 325/419, 346, 323, 325

[56] References Cited

UNITED STATES PATENTS

| | | | |
|---|---|---|---|
| 2,923,820 | 2/1960 | Liguori et al. | 328/155 |
| 3,142,806 | 7/1964 | Fernandez | 329/107 |
| 3,212,014 | 10/1965 | Wiggins et al. | 329/107 |
| 3,353,108 | 11/1967 | Branham | 329/107 |
| 3,505,609 | 4/1970 | Varsos et al. | 328/109 X |
| 3,508,158 | 4/1970 | Marchese | 328/117 |
| 3,706,935 | 12/1972 | Hughes | 328/141 X |

*Primary Examiner*—Alfred L. Brody
*Attorney, Agent, or Firm*—R. S. Sciascia; G. J. Rubens; T. M. Phillips

[57] ABSTRACT

The incoming signal is sampled at a predetermined rate during intervals of time. The sampled signals are fed to a comparator circuit which determines the highest amplitude sample during the interval. A counter counting at the sampling rate is reset at the beginning of each interval and at the occurrence of a pulse from the comparator. The counter output signal has a maximum amplitude that is proportional to the time interval between the occurrence of the largest sample and the end of the sampling interval. An automatic frequency control, responsive to the output of the counter, controls the sampling rate so the average position of the largest sampled signal is retained in the center of the sampling interval.

3 Claims, 3 Drawing Figures

REGENERATIVE, SYNCHRONOUS, PULSE PHASE DEMODULATOR

BACKGROUND OF THE INVENTION

In general, pulse systems require a substantial signal-to-noise ratio for reliable information retrieval. Specific signal-to-noise ratio requirements are determined by the error rate that the system can tolerate. Synchronous demodulation can provide error detection and correction thus increasing noise tolerance of the system. To do this, special synchronization patterns, or signal regularities are used to distinguish the signal from random noise. However, difficulty arises in the area of covert communications where background noise is used as camouflage. In this system the transmitted signal must have few distinguishing characteristics. Coding patterns for synchronization become long and complex, clock tolerances are difficult to maintain and become expensive to build.

SUMMARY OF THE INVENTION

The present invention provides a pulse phase demodulator which can extract information from a pulse phase modulated signal whose peak amplitude is near the root means square level of background noise. The pulse phase modulated signal is sampled to determine the maximum signal during a frame cycle to determine its position in the cycle. This position represents the signal intelligence and is converted to a voltage proportional thereto. A feedback circuit means is provided to lock the sampling cycle to the incoming signal.

Accordingly, an object of the invention is a provision of a pulse phase demodulator which will lock onto and demodulate a pulse phase modulated signal in which no reference pulse is present.

Another object of the invention is a provision of a pulse phase demodulator wherein a synchronization circuit regenerates a reference signal by analyzing signal parameters.

Another object of the invention is the provision of a pulse phase demodulator which can discriminate against false signals and allows the processing of signals very near the background noise level.

Other objects and many of the attendant advantages of this invention will be readily appreciated as the same becomes better understood by reference to the following detailed description when considered in connection with the accompanying drawings.

BRIEF DESCRIPTION OF THE INVENTION

DESCRIPTION OF THE PREFERRED EMBODIMENTS

Figure 2:
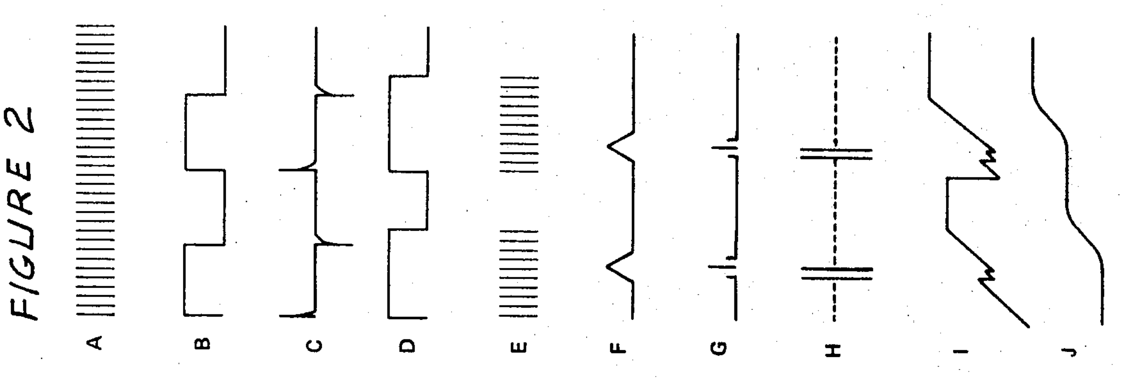
FIG. 2 is a graph of waveforms depicted at various points in the circuit of FIG. 1.

A pulse phase modulated signal at input terminal 10 is sampled by applying a burst of gating signals to terminal 14 of analog gate 11 in a manner to be described below. The sampled signals are applied directly to the positive terminal of comparator 12 and through diode 15 and resistor 16 to a peak storage capacitor 18. The voltage stored on capacitor 18 is applied to the negative terminal of comparator 12. At the end of each sampling cycle capacitor 18 is discharged through transistor 20. The values of resistor 16 and capacitor 18 should be chosen to allow the voltage of the negative input of comparator 12 to rise to the sample value during the sampling interval. Successive samples during a sampling interval are compared with the value stored on capacitor 18. Comparator 12 generates a positive trigger signal each time the new sample is larger than any previous samples in that interval.

The sampling rate is provided by the output of a voltage controlled oscillator 22 fed to AND gate 24. The interval of sampling is provided for by feeding the output of oscillator 22 to a dividing circuit 26 to provide a control signal for triggering multivibrator 28. The output pulse from multivibrator 28 is fed to AND gate 24. The output of the AND gate 24 is coupled to terminal 14 of analog gate 11 and to pulse counter 30.

Pulse counter 30 counts pulses until it is reset by a pulse from OR gate 32. The inputs to OR gate 32 are from comparators 12 and differentiating circuit 34. The output from pulse counter 30 is fed to a slow integrating circuit 36 and to a fast integrating circuit 38. The output of slow integrating circuit 36 is used to control oscillator 22. The output from fast integrating circuit 38 is the intelligence required and is fed to an audio processing circuit (not shown).

Figure 1:
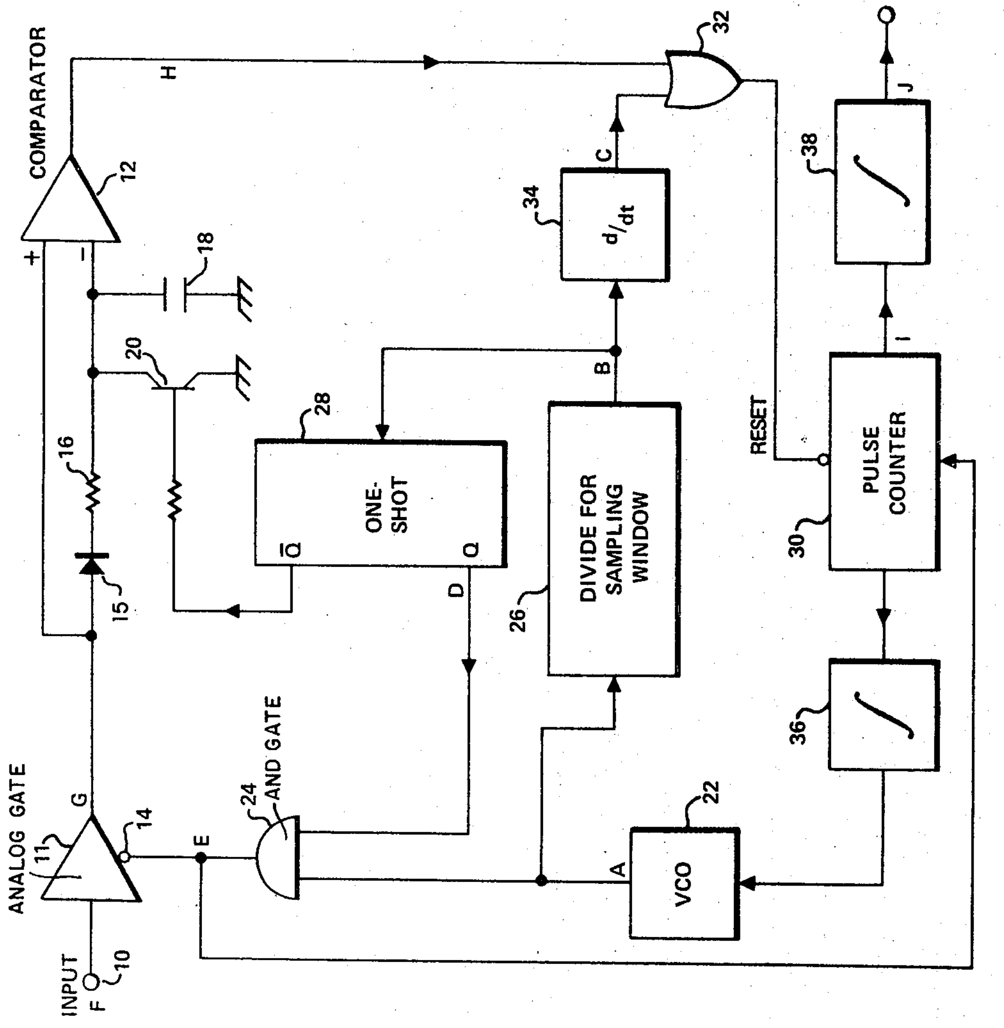
FIG. 1 is a block diagram of a preferred embodiment of the invention.

In operation and referring to FIGS. 1 and 2 in carrying out the invention the purpose of the circuit is to sample each frame for valid signals, choose the largest signal, and indicate its position in the frame. Valid signals may occupy one of 64 time slots located in 1 microsecond intervals. Therefore, the first function of the circuit is to generate a burst of 64 pulses (waveform E) at 1 microsecond intervals for gating and time reference during each frame. This is done by initiating a 64 microsecond gate signal (waveform D) from one-shot multivibrator 28 with the 10KHz output (waveform B) from divider circuit 26. Oscillator 22 should be operating at 1MHz and provides the pulse of waveform A. Sampling is accomplished by using the pulse burst from gate 24 to control gate 11. The largest signal is chosen by storing the first sampled signal (waveform G) on capacitor 18, comparing the second sample with the first and retaining the larger, and then continuing the comparison process through the frame with comparator 12 providing an output trigger signal (waveform H) for each new larger signal. The last trigger from the comparator 12 is the position of the largest received sample of the frame. To select the last trigger from comparator 12 from each frame and provide an output voltage whose magnitude is the analog of the position of the largest signal in the frame, pulse counter 30 counts pulses from the sampling burst. Each trigger signal (waveform H) from comparator 12 resets pulse counter 30 to 0 therefore, at the end of the sampling cycle counter 30 contains a 64-N counts, where N represents the time slot containing the largest sample of the frame. Because the counter receives no signal input between count 64 and the end of the frame, the value 64-N is held for 36 microseconds. The output of the counter 30 is read during this period. The counter readings for each frame are integrated with a time constant of about five times the frame.

In order for the sampling mechanism to be synchronized to the incoming signal (waveform F), oscillator 22 must be locked to the oscillator in the transmitter. It is assumed that the time average position of the largest input sample will be in the middle of the frame or at 32 pulses. The automatic frequency control circuit should be capable of sweeping oscillator 22 through a range in excess of the largest unlocked deviation expected between the transmitter and receiver oscillators. Further the gain of the AFC loop must provide the required correction voltage when the error signal is in the order of 500 nanoseconds. Control of oscillator 22 is accomplished by integrating the output of counter 30 (waveform I) in slow integrator 36 to provide the control voltage. The output of counter 30 is integrated and band-limited to 300–3,000Hz (waveform J) in fast integrator 38.

Obviously many modifications and variations of the present invention are possible in the light of the above teachings. It is therefore to be understood that within the scope of the appended claims the invention may be practiced otherwise than as specifically described.

What is claimed is:

1. A pulse phase demodulator for demodulating pulse phase modulated signals transmitted with a pulse period constrained to an integral number of time units and without reference pulses, a. an input terminal for receiving said pulse phase modulated signals, b. first pulse generating means for generating a plurality of pulses, c. second pulse generating means coupled to the output of said first pulse generating means and being responsive to a first number of predetermined pulses from said first pulse generating means for generating an output gate pulse of a predetermined width, d. gate circuit means coupled to said first pulse generating means and to said second pulse generating means for gating a predetermined number of pulses from said first pulse generating means determined by the width of said gate pulse, e. gating means coupled to said input terminal and to said gate circuit means for sampling said input signal at the occurrence of each of said gated pulses, f. signal selecting circuit means coupled to said gating means for selecting the largest sampled signal occurring during said gating interval, g. time measuring circuit means coupled to said signal selecting circuit means and to said gate circuit means for measuring the time interval between the occurrence of said largest sampled signal and the end of said sampling interval and providing an output voltage having an amplitude proportional to said time interval, h. feedback circuit means coupled between the output of said time measuring circuit means and said first pulse generating means to provide a correction signal to adjust the sampling frequency to the mean input pulse repetition frequency.

2. The demodulator of claim 1 wherein said first pulse generating means is a voltage controlled oscillator.

3. The demodulator of claim 2 wherein said signal gating means is an analog gate whose gain is controlled by said predetermined number of pulses.

* * * * *